Sept. 4, 1951 C. F. DIETRICH ET AL 2,566,875
OPTICAL SCALE READING DEVICE FOR ROTATABLE DIVIDING TABLES
Filed Jan. 14, 1949 7 Sheets-Sheet 1

INVENTORS
Cornelius F. Dietrich
+ Harry J. Smith

By Watson, Cole, Grindle + Watson

Sept. 4, 1951 C. F. DIETRICH ET AL 2,566,875
OPTICAL SCALE READING DEVICE FOR ROTATABLE DIVIDING TABLES
Filed Jan. 14, 1949 7 Sheets-Sheet 2
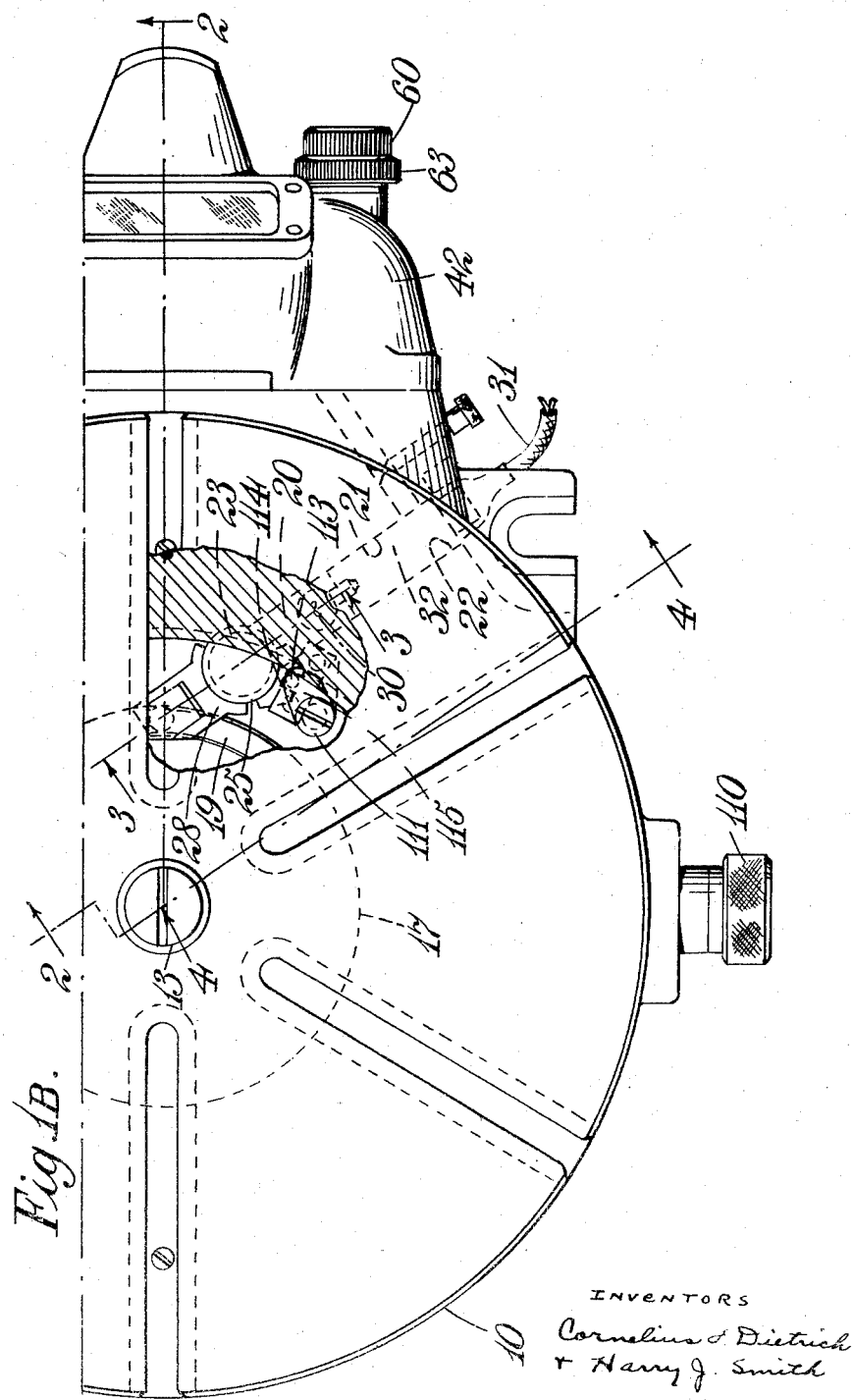
INVENTORS
Cornelius F. Dietrich
+ Harry J. Smith
By Watson, Cole, Grindle + Watson

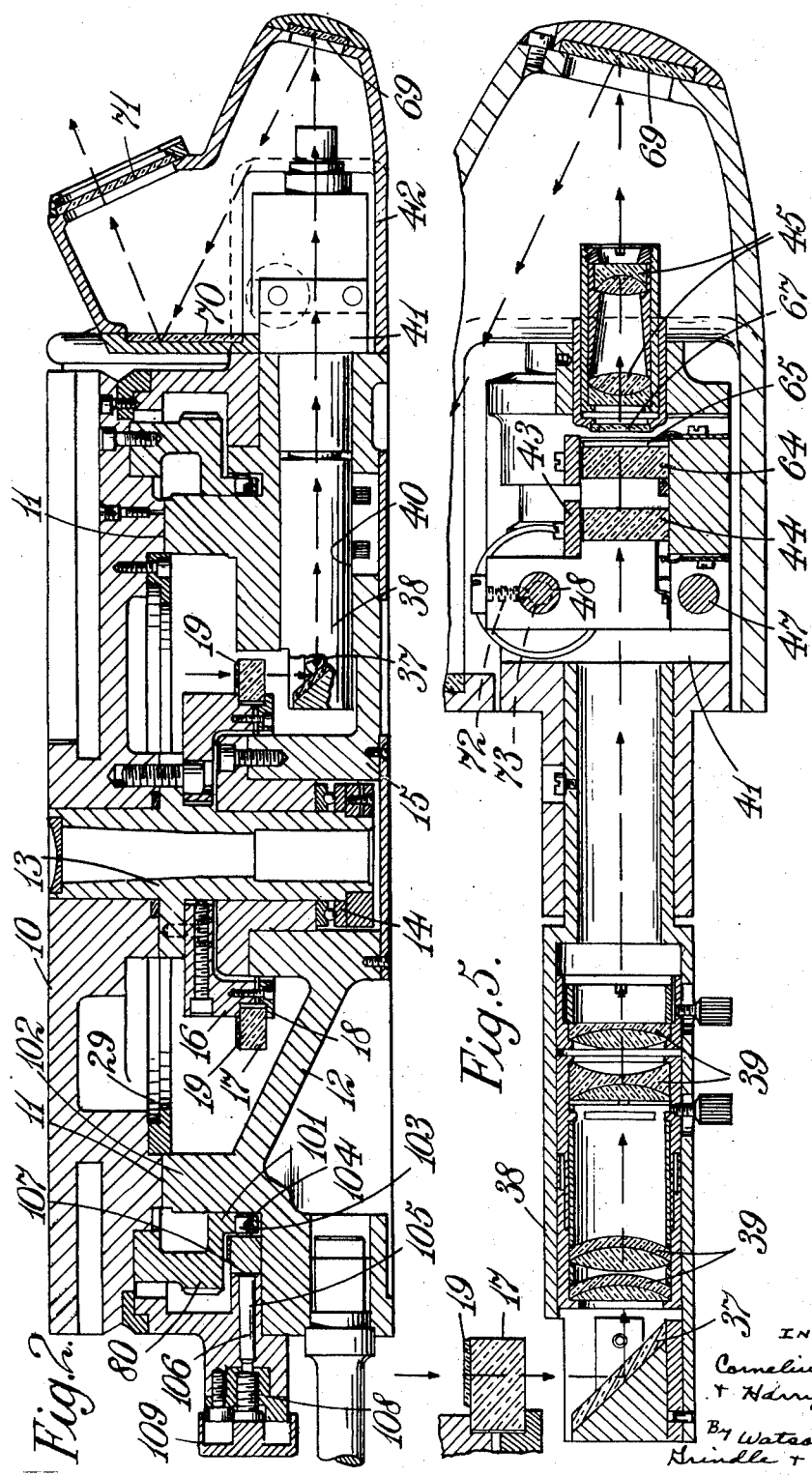

Sept. 4, 1951  C. F. DIETRICH ET AL  2,566,875
OPTICAL SCALE READING DEVICE FOR ROTATABLE DIVIDING TABLES
Filed Jan. 14, 1949  7 Sheets-Sheet 4

INVENTORS
Cornelius F. Dietrich
+ Harry J. Smith
By Watson, Cole, Grindle + Watson

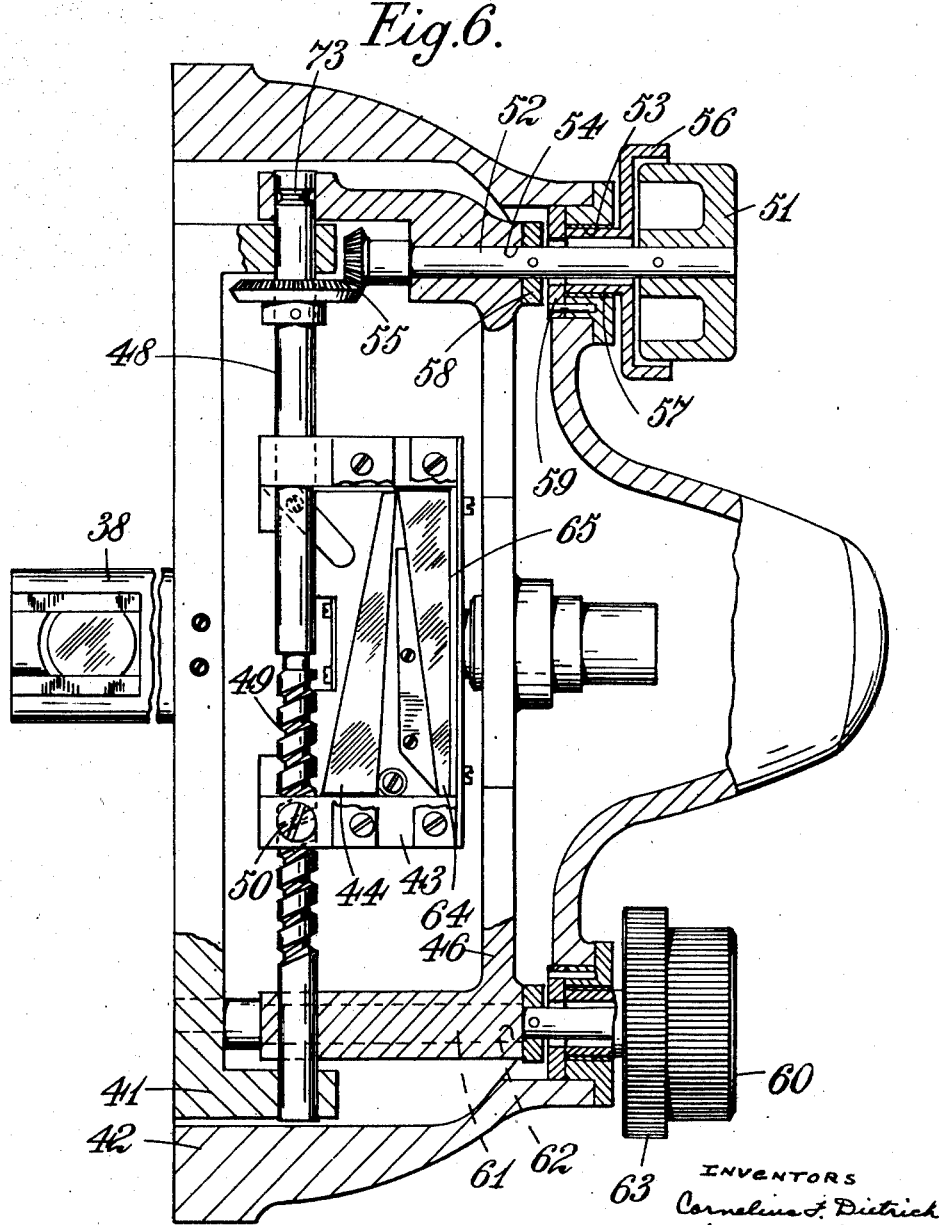

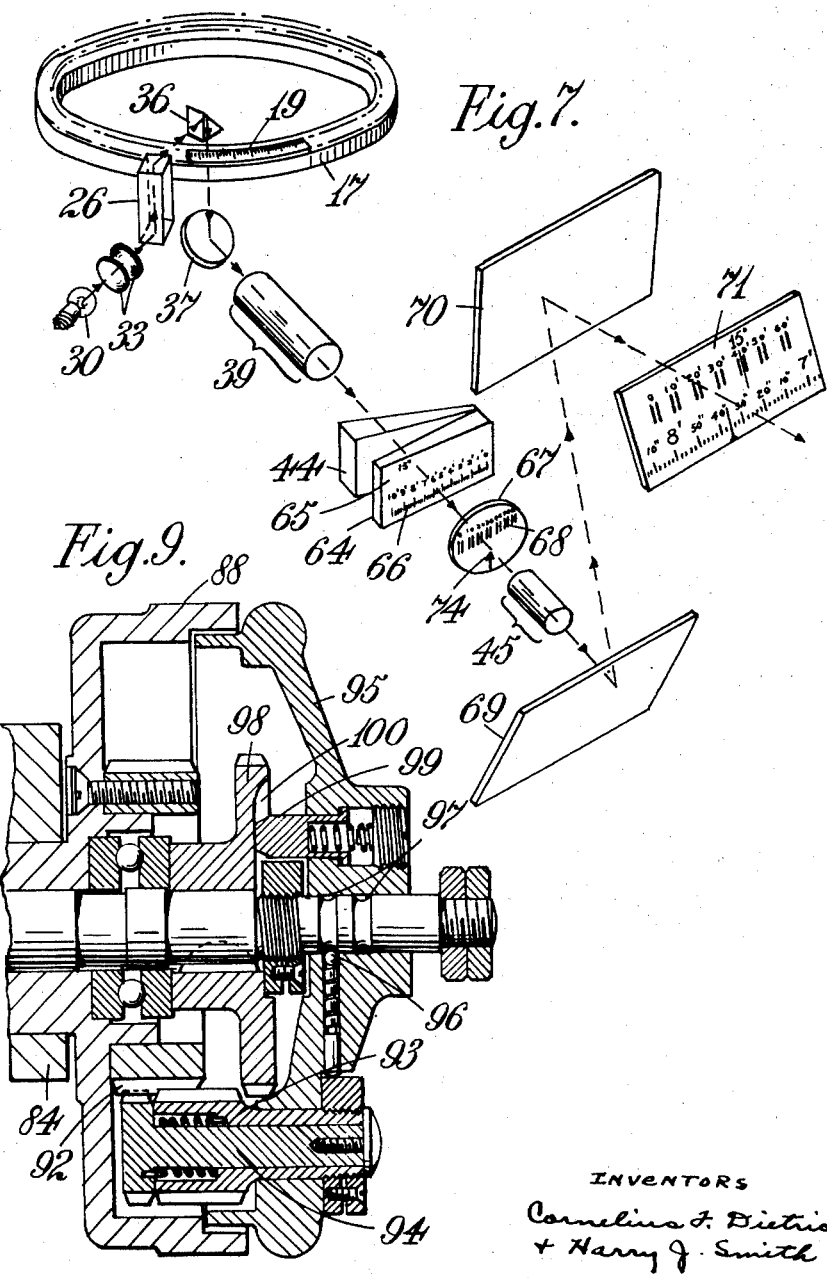

Sept. 4, 1951 C. F. DIETRICH ET AL 2,566,875
OPTICAL SCALE READING DEVICE FOR ROTATABLE DIVIDING TABLES
Filed Jan. 14, 1949 7 Sheets-Sheet 7

INVENTORS
Cornelius F. Dietrich
& Harry J. Smith
By Watson, Cole, Grindle
& Watson Patented Sept. 4, 1951

2,566,875

UNITED STATES PATENT OFFICE 2,566,875

OPTICAL SCALE READING DEVICE FOR ROTATABLE DIVIDING TABLES

Cornelius Frank Dietrich and Harry John Smith, Slough, England, assignors to Optical Measuring Tools Limited, Slough, England, a British company Application January 14, 1949, Serial No. 70,892
In Great Britain January 14, 1948

6 Claims. (Cl. 88—1)

This invention relates to rotatable dividing tables for rotary indexing, such as are used with jig borers, horizontal borers, grinding machines and vertical and universal millers.

Some constructions of circular dividing table incorporate a microscope as an aid to the accurate reading of a circular degree scale on the table. But the use of a microscope has the disadvantage that sighting through the eyepiece is inconvenient and liable to produce eyestrain. The main object of the present invention is to provide an improved circular dividing table having measuring means for accurately determining to close limits the angular setting of the table and permitting the reading with facility of this setting. A further feature of the invention consists of control means for accurate setting of the table.

According to the present invention, in a rotatable dividing table having a graduated circular scale rotatable with the table and located beneath it in a supporting base, there is provided an illuminant in the base for the circular scale, a fixed optical projecting system adjacent to the illuminated portion of the circular scale and a projection screen at the side of the base on to which the projecting system throws a magnified image of the said portion of the circular scale.

Preferably the optical system comprises a light source for illuminating the portion of the circular scale, an objective lens system for magnifying the image of said scale to the desired size and a lens system comprising a projector for throwing the magnified image onto the screen. Preferably in a rotatable dividing table measuring means for determining the angular setting comprise in combination a graduated circular scale mounted concentrically with the table for rotation therewith, an optical projecting system for projecting an image of a portion of the scale, a screen to display said image and means for superimposing on the image on the screen a reference scale having a range of one division of the circular scale and of the same size as the projected image thereof, but having subdivisions against which intermediate positions of the circular scale can be read. The reference scale may be engraved on a transparent grating interposed in the optical path to the projection screen in such manner that an image of the reference scale is projected on to the screen together with the image of the circular scale. Preferably there is interposed in the optical projecting system a movable subdivided scale, also projected upon the screen, so connected to means for moving the image of the circular scale as to move at a constant high velocity ratio relatively thereto, and an index for reading movements of the movable scale so that small movements of the circular-scale image can be exactly ascertained by reading the larger movements of the said movable scale.

The prism system and a projector lens may be together mounted on a main cradle which is laterally adjustable relative to an objective lens system located between the circular scale and the cradle so as to permit moving the image of the grating relatively to the image of the circular scale thereby facilitating reading the table setting on the screen, and in which the prism system is mounted on a sub-cradle which is carried by the first and is laterally adjustable relatively thereon to permit moving the graticule image into a desired position relatively to the grating image. Locking means may be provided which permit holding the main cradle in a desired lateral position relative to the objective lens system, and locking means are provided which permit holding the sub-cradle in a desired lateral position relative to the main cradle.

The table control means for effecting rotation and setting of the table may comprise a worm and worm-wheel drive for the table, and a two-speed epicyclic gear for driving the shaft from a hand control, there being a direct drive to the worm shaft from the hand control to the worm-gearing and an indirect drive with speed-reduction through the epicyclic gear. Locking means may be provided for holding the table against rotation in its set position, and also the worm may be arranged so that it can be disengaged from the worm-wheel and thereby permit free rotation of the table by hand for rough adjustment to the angular setting.

The following is a description, by way of example, of one construction of circular dividing table according to the present invention, reference being made to the accompanying drawings in which:

Figures 1A and 1B show a table top in plan with portions broken away to show the interior.

Figure 2 shows a vertical section through line 2—2 of Figures 1A and 1B as seen as a right projection.

Figure 5 shows an optical system in vertical section through line 2—2 of Figure 1B and Figure 6 shows its casing broken away to show a plan of a prism system and controls.

Figure 7 shows diagrammatically an optical path of a ray from the lighting unit to a screen.

Figures 8 and 9 show a drive in vertical section through line 8—8 of Figure 1A, in two positions.

Figure 1A:
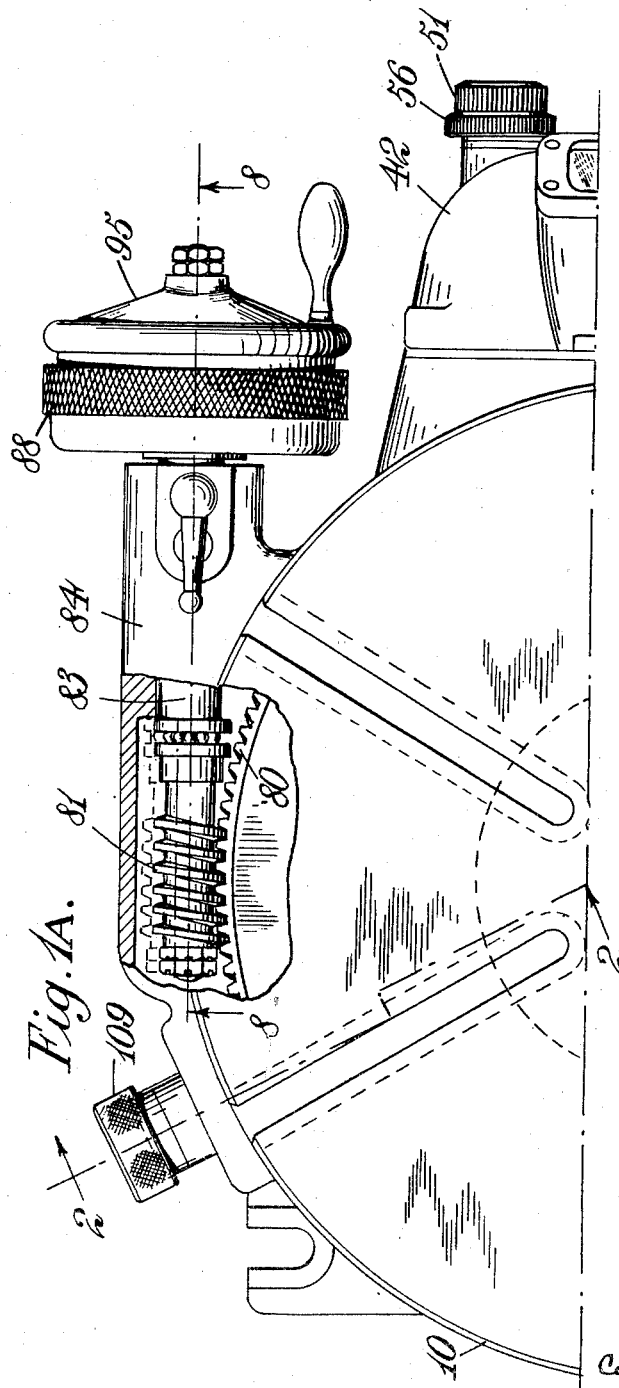

Referring to Figures 1A, 1B and 2, a circular dividing table 10 is mounted for rotation on a bearing surface 11 at the top of a circular base casting 12. At the centre of and beneath the table 10 is fixed a vertical pivot 13 which is mounted for rotation in bearings 14 within a boss 15 on the base 12. Between the table 10 and base 12 the pivot 13 carries a flange 16. A graduated circular scale showing degrees is afforded by a clear-glass annulus 17 secured by a clamping ring 18 to the perimeter of the flange 16 so as to rotate concentrically with the table 10. The upper face of the glass annulus 17 bears a transparent ring 19 engraved with opaque degree lines and numerals ranging from 0° to 359°.

Figure 3:
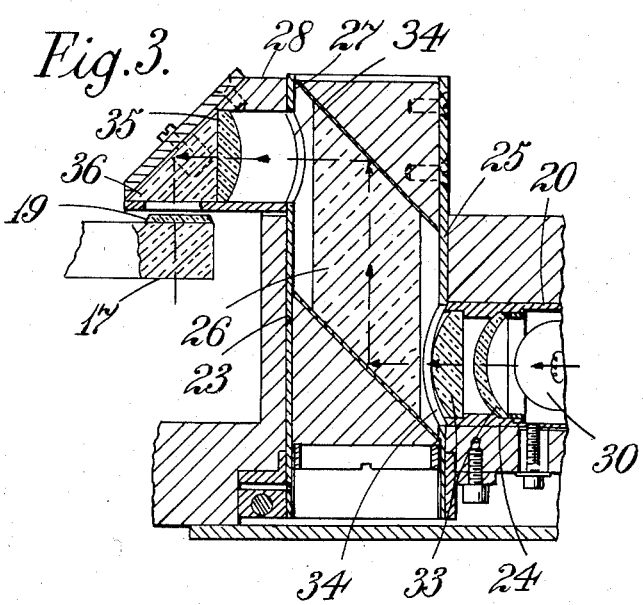
Figure 3 shows a lighting-unit in vertical section through line 3—3 of Figure 1B.
Figure 4:
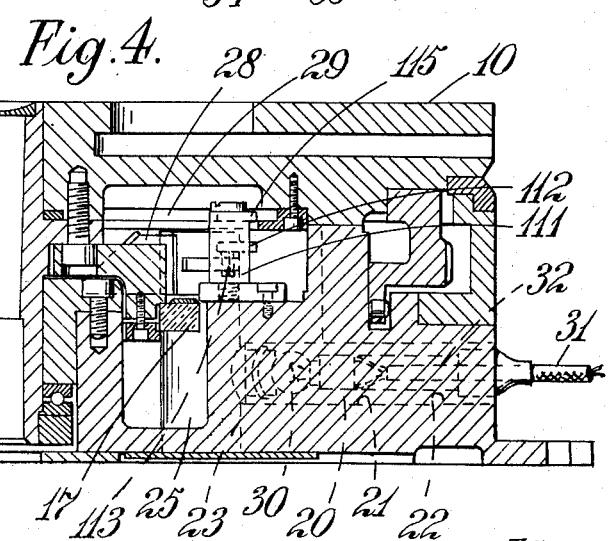
Figure 4 shows the unit and a locking device in elevation taken through line 4—4 of Figure 1B.

Referring to Figures 1B, 3 and 4, a tubular lighting unit 20 for illuminating a small segment of the glass annulus 17 is located in a horizontal passage 21 within the base 12. This passage 21 extends from an opening 22 (see Figure 1B) at the base perimeter to a vertical bore 23 in the base 12 whose axis lies a little outside the perimeter of the glass annulus 17. The lighting unit 20 can be withdrawn for replacement through the opening in the base 12. The vertical bore 23 at the inner end of the lighting unit 20 is fitted with a tubular housing 25 for a rhomb prism 26. At its upper end 27, the housing 25 carries a lateral extension 28 which projects over the upper face of the glass annulus 17 so that a beam of light can be directed normally on to the ring 19.

The prism housing 25 is made rotatable in its bore 23 so that the extension 28 can be swung out clear of the annulus 17 for removal and replacement of the annulus during assembly. In order to prevent damage to the annulus 17 by the extension 28, a locking device 111, shown in Figures 1B and 4 is fitted in the base 12 to prevent movement of the table 10 and annulus 17 until the extension 28 is swung clear. This device 111 consists of a double-armed rocking-lever pivoted about a vertical axis in the base 12. A lower arm 112 of the lever has a dependent pin 113 which engages a slot 114 in the prism housing 25 to form a pin-and-slot connection therewith such that rotation of the housing 25 causes a rocking movement of the lever 111. The upper end of the lever 111 is in the form of a tongue 115 for moving in and out of an annular groove 29 round the inside of the table 10. When the housing extension 28 lies over the annulus 17 the tongue 115 on the rocking lever 111 is engaged in the groove 29 and so prevents the table 10 and annulus 17 being lifted from the base 12. The tongue 115 is shown engaged in the groove 29 in Figure 4. On turning the extension 28 away from the annulus 17, the tongue 115 moves out of the groove 29, and the table 10 is freed for removal. The tongue 115 also acts as a stop to prevent replacement of the table 10 and housing 25 while the housing extension 28 is in its overlying position.

The lighting unit 20 contains an electric lamp 30 connected to a supply cable 31 running out through the outer end 32 of the unit 20. Figure 3 shows how light from the lamp 30 is projected through condenser lenses 33 at the inner end 24 of the unit 20 into the tubular prism housing 25 through a side opening 34 therein. The tubular housing 25 is fitted with a rhomb prism 26 by means of which a light beam from the lamp 30 is reflected up the housing 25 and thence inwards of the table 10 through a side opening 34 at the upper end of the extension 28. In the end of the extension 28 are a lens 35 and prism 36, and light is deflected downwardly through a portion of the ring 19 and glass annulus 17.

Referring more particularly to Figure 5, under the glass annulus 17 immediately below the extension 28 on the prism housing 25 is an inclined mirror 37 at the inner end of a tube 38 containing an objective lens system 39 for magnifying the portion of the annulus projected by the lamp 30. The objective lens tube 38 is fitted in a radial passage 40 within the base 12 (Figure 2). The tube 38 carries on its outer end a bracket 41 located at the back of a casing 42 fitted on the front of the base 12. In the casing 42 is mounted a sub-cradle 43 which is best seen in Figure 6. The sub-cradle 43 is laterally movable and bears a prism system having a pair of adjacent prisms 44, 64 in line with the objective lens system 39. The prism system is such that a small transverse movement of a degree line image projected on to the prism system from the ring 19 on the glass annulus 17 results in a greatly magnified transverse movement of the degree line in a projection lens system 45 fitted to a main cradle 46 at the outside of the prism system.

The sub-cradle 43 is carried by the main cradle 46 and is supported for transverse sliding movement on two parallel rods 47, 48 disposed one above the other in the main cradle 46. A pin 72 is threaded in the main cradle 46 and prevents endwise movement of the upper rod 48 by engaging a co-operating groove 73 (Figure 5). The upper rod 48 is machined with a coarse-pitch thread 49 engaged by a pin 50, similar to the first pin 72 which is threaded in the sub-cradle. Thus rotation of the upper rod 48 will produce transverse sliding movement of the sub-cradle 43, so that the prism system is shifted laterally between the objective lens 39 and the projection lens 45. This movement is effected manually by a control knob 51 at the front and to one side of the casing 42. The knob 51 is fixed on the outer end of a shaft 52 which projects through an opening 53 in the casing 42. The shaft 52 is supported in a bearing 54 on the main cradle 46 and is connected at its inner end and to the upper rod 48 by bevel gearing 55. An annular locking knob 56 concentric with the control knob 51 has a hub 57 which screws into the casing 42 for clamping together axially a friction disc 59 on the hub 57 and a collar 58 on the shaft.

At the other side of the casing 42 is a second control knob 60 fitted on an eccentric shaft 61 which extends below the screwed rod 48 and passes through a bearing 62 in the main cradle 46. The eccentric shaft 61 is pivoted at its inner end in the bracket 41 at the back of the casing 42. An annular locking knob 63 locks the knob 60 and shaft 61 in their set position in a manner similar to that in which the other locking knob 56 locks knob 51 and shaft 52. Rotation of the second control knob 60 has the effect of laterally shifting the main cradle 46 in front of the bracket 41. As the sub-cradle 43 is carried by the main cradle 46, as a consequence both the projection lens system 45 and the prism system will be laterally shifted together.

As shown in Figure 7, the external face 65 of the outer prism 64 in the prism system is enthe index 74. The sub-cradle is then locked in position by its annular control knob 56. In order to rotate the table 10 rapidly so that an image of the zero degree line due to the ring 19 is at least in the vicinity of the screen 71, the worm 81 is disengaged from the worm-wheel 80 by rotating the knurled drum 88 and bearing 83 with it, until the table can be rotated free from the worm 81. Further rotation of the knurled drum brings the worm 81 again into driving engagement with the worm-wheel 80. The bearing 83 is then locked by screwing up the locking pin 89. The hand-wheel 95 is pressed inwardly toward the table 10 until dog 99 is retained in engagement with the radial slot 100 of the spur-wheel 98 by the spring-loaded ball 96. The table 10 is then rotated by the hand-wheel 95 until the zero degree line image sets conveniently near the zero pair of lines of the image of the reference scale 68 on the screen 71. In order to move the degree line image into the exact position the hand-wheel 95 is pulled outwardly from the table 10 until the pinion 93 is retained in engagement with the spur-wheel 98 by the spring-loaded ball 96. This enables the hand wheel 95 to be rotated so that the degree line image moves across the screen and sets exactly mid-way between the zero pair of lines of the reference scale 68. By the above sequence of operations the table is set at the zero reading.

If the operator desires to rotate the table through an angle of say, 15° 47′ 36″ from the zero reading, the above sequence of operations for rotating the table is carried out. Firstly, the worm 81 is disengaged from the worm-wheel 80 and then the table is rotated by hand until the image of the 15 degree line of the ring is brought into approximately the desired position. Thereafter the worm 81 is again brought into engagement with the worm-wheel 80 and then the table is rotated by the hand-wheel 95 and direct drive to move the degree line mid-way between the pair of lines of the reference scale image indicating the 40′ mark. The sub-cradle 43 is now unlocked by unscrewing the annular control knob 56 so that the cradle 43 can be moved by its control knob 51 until the 7′ 36″ mark of the graticule 66 coincides with the index 74. The sub-cradle 43 is again locked by its annular control knob 56. The 15 degree line image has moved slightly away from its position between the 40′ pair of lines during the movement of the graticule 66, and upon now moving it back again between the 40′ pair of lines by using the hand-wheel 95 and the reduction drive through the epicycle gear train, the table will have been rotated through exactly 15° 47′ 36″. The reading on the screen 71 appears as shown in Figure 7.

If desired the table can be locked against rotation by screwing up knobs 109 and 110.

We claim:

1. A rotatable dividing table comprising in combination a base, a table rotatably mounted thereon, a main circular scale secured to the underside of the table to rotate therewith, an illuminant therefor, an optical projection system directed upon the scale, a projection screen carried by the base and positioned to receive an image of main scale markings from the optical projection system, a prism-carrying cradle, a pair of similar prisms mounted in the cradle, reversed in relation to one another and located in the path of the light beam projecting said image to displace the same on the screen, said prisms being canted relatively to one another, means to move the cradle with the prisms bodily transversely across the light beam and so vary the displacement of said image, a secondary scale associated with said prisms to move therewith and located in the path of the light beam so as to be projected upon the screen along with the image of main scale markings, and index means visible upon the projection screen for the main and secondary scales and into registration with which the markings of said scales can be adjusted by rotation of said rotatable table and movement of said prisms, respectively.

2. A rotatable dividing table as claimed in claim 1 having a reference scale in addition to the main and secondary scales, which reference scale is visible upon the projection screen and comprises a series of markings into registration with any one of which a main scale marking can be adjusted.

3. A rotatable dividing table as claimed in claim 1 wherein a transparent reference scale member is located in the path of the light beam so as to be projected upon the projection screen along with the main scale and secondary scale markings.

4. A rotatable dividing table as claimed in claim 1 wherein a projection lens of the optical system is mounted upon a laterally movable main cradle and the prisms system are mounted upon a sub-cradle carried by the main cradle so as to be displaceable thereon and separate adjusting means are provided for moving the sub-cradle upon the main cradle laterally in one direction and the prisms system upon the cradle in a direction at right angles thereto.

5. In a setting device for a movable member the combination of a main movable scale movable in association with said member, an illuminant therefor, an optical projection system directed thereon, a projection screen positioned to receive an image of main scale markings from the optical projection system, a prism-carrying cradle, a pair of similar prisms immovably secured in the cradle so that they are reversed in relation to one another and canted relatively to one another, that is, their internally opposed faces are not parallel, the cradle being located so that the light beam passes through the prisms, means to move the cradle with the prisms bodily transversely across the light beam and so vary the displacement of said image, a secondary scale to indicate movement of said prisms, and index means visible upon the screen into registration with which the image of the main scale markings can be adjusted by said movement of the prisms, said secondary scale being so located in the light beam of the optical projection system that its image is projected on the projection screen along with the image of the main scale markings.

6. A rotatable dividing table device comprising a base, a table rotatable on the base, a main movable scale secured to the rotatable table, and a setting device for the rotatable table, said setting device including an illuminant for said main movable scale, an optical projection system directed thereon, a projection screen carried by said base and positioned to receive an image of main scale markings from the optical projection system, a prism-carrying cradle, a pair of similar prisms immovably secured in the cradle so that they are reversed in relation to one another and canted relatively to one another, that is, their internally opposed faces are not parallel, the cradle being located so that the light beam passes through the prisms, means to move the cradle graved in its lower half with a graticule 66 comprising a lateral minute-second scale having a range of 10 minutes from 0' to 10'. The length of the graticule 66 is such that the graticule spans a 10-minute interval of the table setting image produced by laterally shifting the prism and lens system. Each minute division of the graticule 66 is marked with the numerical reading, and the divisions are sub-divided by two second lines of which the 10 second lines are marked with numerical readings. Fixed on the main cradle 46 behind the objective lens 39 and immediately in front of the graticule 66 is a reference scale 67 bearing a single-degree scale 68 marked with 10-minute division lines each having a numerical reading. For convenience of sighting each division on this scale is marked by a pair of parallel lines set close together. The reference scale 67 also bears a central index 74.

Referring more particularly to Figures 2 and 7, an image projected forwardly by the projection lens 45 is reflected back and upwards by an inclined mirror 69 in front of the lens 45 on to a second inclined mirror 70 which is mounted in the top of the casing 42 and thence the image is reflected on to the back of the ground-glass screen 71 fitted to the top and front of the casing 42 in a position such that it is slightly tilted back for convenience of reading measurements of the projected ring 19 and scales 56, 68.

With the angular setting of the table 10 at zero, for example, the screen 71 displays an image of the zero-degree line from the ring 19, set between the zero pair of lines in the image of the reference scale 67 and below the reference scale the fixed central index mark 74 is aligned with the zero line on a portion of the image of the graticule 66.

Figure 8:
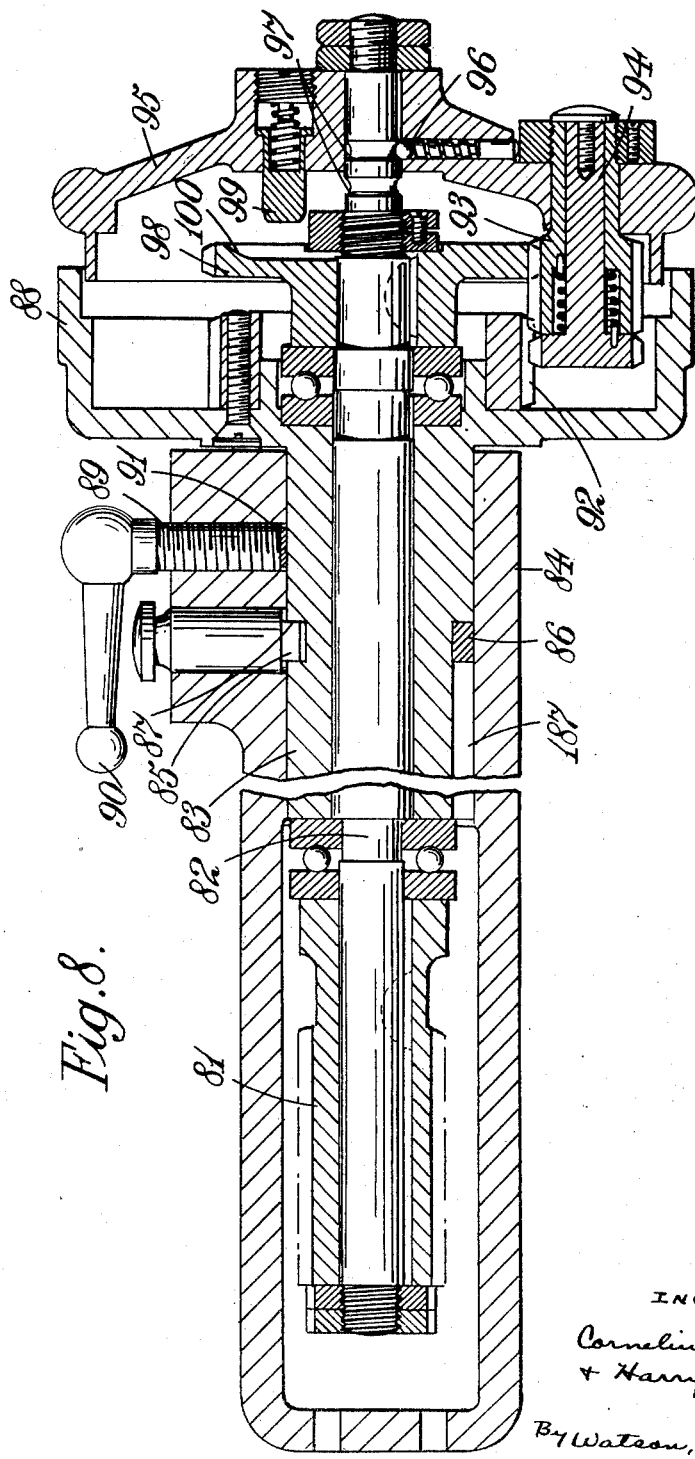

For accurate control in setting the table 10, it is preferred to employ a worm 81 and worm-wheel drive incorporating an epicyclic gear for producing a low-geared drive 80 to effect exact setting of the table. In the preferred construction of control means (Figures 1A, 8 and 9) a worm-wheel 80 on the table 10 is driven by a worm 81 on a shaft 82 carried in a bearing 83 which is eccentrically mounted for rotation in a housing 84 extending forwardly at a tangent to the base 12. Stops 85, 86 on the housing engage an annular groove 87 and longitudinal groove 187 respectively in the bearing to prevent axial movement of the bearing 83 and limit its rotational movement. At its forward end the bearing 83 projects from the housing 84 and is there fitted with a knurled drum 88 by which the bearing 83 is rotated in one or other direction so as to displace the shaft 82 laterally and thereby throw the worm 81 in and out of engagement with the worm-wheel 80. When the worm 81 is disengaged it takes up the position shown by chain-lines in Figure 1A, the table 10 is free to be rotated by hand for quick positioning to a rough angular setting. The bearing 83 is locked in its set position by a locking pin 89 with a handle 90 which screws into the housing 84 and at its inner end bears down on a clamping washer 91 engaging the bearing 83.

Fixed within the knurled drum 88 is an externally-toothed gear ring 92 which is in constant mesh with a pinion 93 carried on a spindle 94 at the rim and inside of a hand-wheel 95. This pinion 93 is diametrically split and spring loaded to relieve back-lash in the gear teeth. The hand-wheel 95 is carried on the projecting outer end of the worm shaft 82 on which it is free to rotate and also has a limited axial movement. A spring-loaded ball 96 in the hand-wheel 95 snaps into one or other of two annular grooves 97 in the shaft 82 when the hand-wheel 95 is shifted along the shaft 82 to an inner or an outer position as shown respectively in Figure 8 and Figure 9. Fixed to the shaft 82 at the inside of the hand-wheel 95 there is a spur-wheel 98 which the pinion 93 engages when the hand-wheel 95 is pulled out, but which is disengaged from the pinion 93 when the hand-wheel 95 is pushed inwards. At the inner position of the hand-wheel 95 a spring-loaded dog 99 at the back of the hand-wheel 95 is urged rearwardly into engagement with a radial slot 100 at the outer face of the spur-wheel 98 whereby the hand-wheel 95 and spur-wheel 98 are locked together for rotation together as a unit.

When the hand-wheel 95 is pushed inwards to disengage the pinion 93 from the spur-wheel the hand-wheel is coupled direct to the spur-wheel 98 by the dog-and-slot connection (99, 100) so that the worm-shaft 82 rotates at the same speed as the hand-wheel. If the worm 81 and worm-wheel 80 are geared 300:1, then an overall gear ratio of this amount is obtained for coarse adjustment of the table.

On pulling out the hand-wheel 95 the dog 99 is disengaged and an epicyclic gear train will be formed by the gear ring 92, pinion 93 and spur-wheel 98. Rotation of the hand-wheel 95 will cause the pinion 93 to ride around and rotate on the fixed gear ring 92 acting as a sun-wheel, and the rotation of the pinion 93 will drive the worm-shaft 82 through the spur-wheel 98. If the gear ring 92 and spur-wheel 98 are formed respectively with 49 and 50 teeth, the epicyclic gear gives a gear reduction of 50:1, so that with the worm ratio of 300:1 a reduction of 15,000:1 is afforded for precise adjustment of the table 10.

In order to lock the table 10 at its angular setting, the table is fitted near its perimeter with a concentric skirt 101 (Figure 2) riding over a fixed ring 102 upstanding from the base 12. The skirt 101 houses a circle of spaced rollers 103 each disposed radially of the skirt 101 and fitted in a hole 104 within the skirt 101 so as to slide freely in the hole 104 along its axis without lateral play. A radial hole 105 in the base of the dividing table houses a sliding thrust rod 106 whose inner end bears on a pad 107 which spans the outer ends of several rollers 103 in the skirt 101. A screwed spindle 108 co-axial with the thrust rod 106 is rotatable by a knob 109 for pushing the thrust rod 106 inwards in order to force the pads 107 against the several rollers 103. The rollers 103 are in consequence clamped between the pad 107 and the fixed base ring 102 and the skirt 101 and table 10 are thus clamped against rotation without any pressure being applied to the table bearing 14. A second knob 110 (Figure 1B) for clamping the table 10 is similar to knob 109 and is disposed further round the base at the same level.

In order to set the table 10 initially at a zero reading on the screen 71 prior to rotating the table through a desired angle, an operator commences by moving the main cradle 46 laterally by rotating its control knob 60 until an image of the reference scale 67 appears centrally on the screen 71. The main cradle is then locked in position by its annular locking knob 63. The sub-cradle 43 is now moved laterally by rotating its control knobs 51 until the image of the zero line of graticule 66 coincides with the image of with the prisms bodily transversely across the light beam and so vary the displacement of said image, a secondary scale to indicate movement of said prisms, and index means visible upon the screen, into registration with which the image of the main scale markings can be adjusted by said movement of the prisms, said secondary scale being so located in the light beam of the optical projection system that its image is projected on the projection screen along with the image of the main scale markings.

CORNELIUS FRANK DIETRICH.
HARRY JOHN SMITH.

REFERENCES CITED

The following references are of record in the file of this patent:

UNITED STATES PATENTS

| Number | Name | Date |
|---|---|---|
| 1,508,585 | Wild | Sept. 16, 1924 |
| 1,682,672 | Guild | Aug. 28, 1928 |
| 1,974,606 | Fassin | Sept. 25, 1934 |
| 2,276,625 | Patrick | Mar. 17, 1942 |
| 2,363,877 | Larsen et al. | Nov. 28, 1944 |
| 2,367,759 | Decker et al. | Jan. 23, 1945 |
| 2,422,611 | Becker et al. | June 17, 1947 |
| 2,465,497 | Turrettini | Mar. 29, 1949 |
| 2,480,237 | Godfrey et al. | Aug. 30, 1949 |

FOREIGN PATENTS

| Number | Country | Date |
|---|---|---|
| 813,311 | France | Feb. 22, 1937 |
| 870,687 | France | Dec. 22, 1941 |
| 574,295 | Great Britain | Dec. 31, 1945 |
| 615,183 | Great Britain | Jan. 3, 1949 |